Aug. 7, 1928.
H. C. ZIMMERMAN
DRAFT COUPLING
Filed Jan. 15, 1927
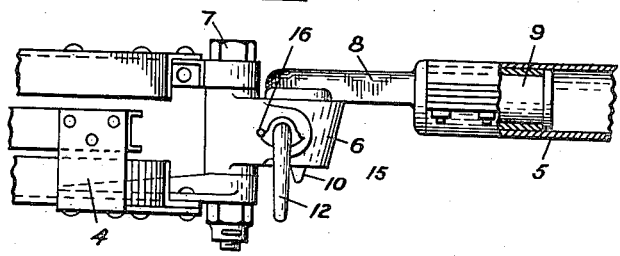
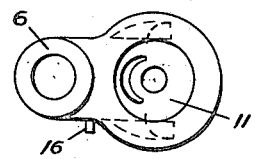
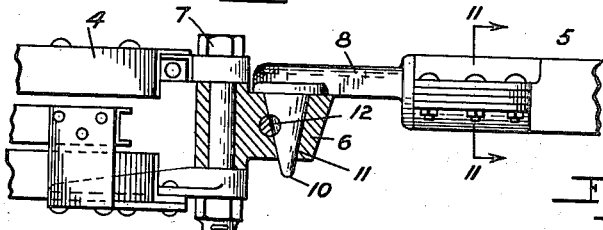
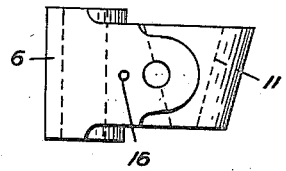
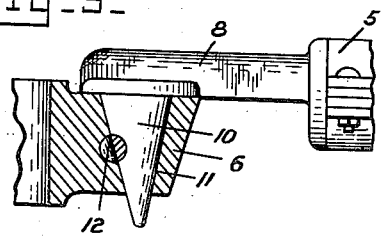
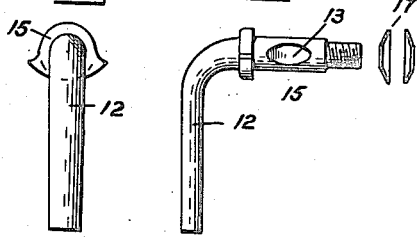
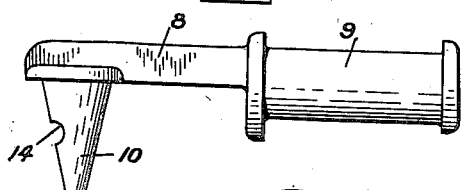
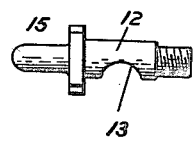
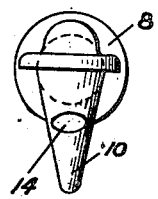
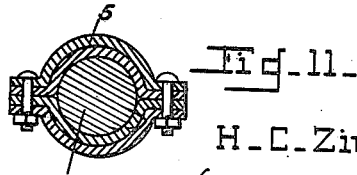
Inventor
H. C. Zimmerman
By W. M. Roach.
Attorney Patented Aug. 7, 1928.

1,680,236

UNITED STATES PATENT OFFICE.

HARRY C. ZIMMERMAN, OF WASHINGTON, DISTRICT OF COLUMBIA.

DRAFT COUPLING.

Application filed January 15, 1927. Serial No. 161,405.

(GRANTED UNDER THE PROVISIONS OF THE ACT OF MARCH 3, 1883, 22 STAT. L., 625, AS AMENDED APRIL 30, 1928.)

The invention described herein, if patented, may be manufactured and used by or for the Government for governmental purposes without the payment to me of any royalty thereon.

The subject of this invention is a draft coupling.

The principal object of the present invention is to provide a simple and efficient draft coupling, especially applicable in connecting carts such as limbers and caissons and designed to dispense with the use of a fifth wheel.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of a pair of members connected by means of the improved coupling;

Fig. 2 is a simliar view partly in section showing the members connected but not locked;

Fig. 3 is a similar view showing the coupling in locked position;

Figs. 4 and 5 are detailed views in plan and elevation of the socket member;

Figs. 6 and 7 are detailed views in side and end elevation of the draw bar member;

Figs. 8, 9 and 10 are detail views of the latch; and

Fig. 11 is a sectional view on the line 11—11 of Fig. 2.

Referring to the drawings by numerals of references:

There is shown in Fig. 1 a member 4 constituting the rear part of a lead cart and a member 5 comprising the front part of a trailer cart connected by a coupling consisting of a laterally swinging socket member 6 secured by the vertical pivot 7 to the lead cart and a draw bar member 8 carried by the trailer cart. The draw bar is formed at one end with a cylindrical portion 9 whereby it may be swivelly connected to the trailer cart and at its free end it is provided with a downwardly projecting stud 10 preferably tapered as shown and fitting into a correspondingly shaped aperture 11 in the socket member.

A latch 12 rotatably mounted in the socket member so as to intersect a portion of the aperture 11 is formed with a recessed portion 13 shaped to correspond to the aperture 11 so that in a certain position of the latch the stud may freely enter. The stud is also formed with a recess 14 which when the stud is fully inserted is in position opposite the recessed portion of the latch. By simply turning the latch it will enter the recess in the stud forcing the stud home and securely holding it against removal. In order to indicate the locking and unlocking position of the latch it is provided with a plate 15 whose ends are brought up against a pin 16. Spring washers 17 are provided for holding the latch in adjusted position.

I claim:

1. In a coupling for connecting a pair of vehicles, a draw bar arranged to be swivelly mounted on one of the vehicles and having a downwardly projecting tapered stud on its free end, a laterally swinging socket member carried by the other vehicle and having a tapered aperture for receiving the stud, a latch mounted in the socket member and positioned to intersect the aperture therein, said latch formed with a recess conforming to the outline of the aperture in the socket member and the stud formed with a recess for receiving the latch when said latch is turned.

2. In a coupling for connecting a pair of vehicles, a laterally swinging socket member having a tapered aperture, a draw bar having a tapered stud receivable in said aperture, a latch mounted in the socket member and positioned to intersect the aperture therein, said latch formed with a recess to permit entry of the stud and the stud formed with a recess for receiving the latch when said latch is turned.

3. In a coupling for connecting a pair of vehicles, a laterally swinging socket member having a tapered aperture, a swivelled draw bar having a tapered stud receivable in said aperture, and a latch mounted in the socket member, said latch and stud formed with registering recesses, the latch movable to one position to permit entry of the stud and movable to another position to engage in the recesses of the stud.

4. In a coupling for connecting a pair of vehicles, a laterally swinging socket member having an aperture, a swivelled draw bar having a stud receivable in said aperture, and a latch mounted in the socket member, said latch and stud formed with registering recesses, the latch movable to one position to permit entry of the stud and movable to another position to engage any of the recesses of the stud.

HARRY C. ZIMMERMAN.